Nov. 28, 1967  B. W. OLSON  3,355,233
EXTENSIBLE RETAINING DEVICE
Filed Oct. 7, 1966  2 Sheets-Sheet 1

INVENTOR
BUFORD W. OLSON
BY
Williamson, Palmatier & Bains
ATTORNEYS

Nov. 28, 1967 B. W. OLSON 3,355,233
EXTENSIBLE RETAINING DEVICE
Filed Oct. 7, 1966 2 Sheets-Sheet 2
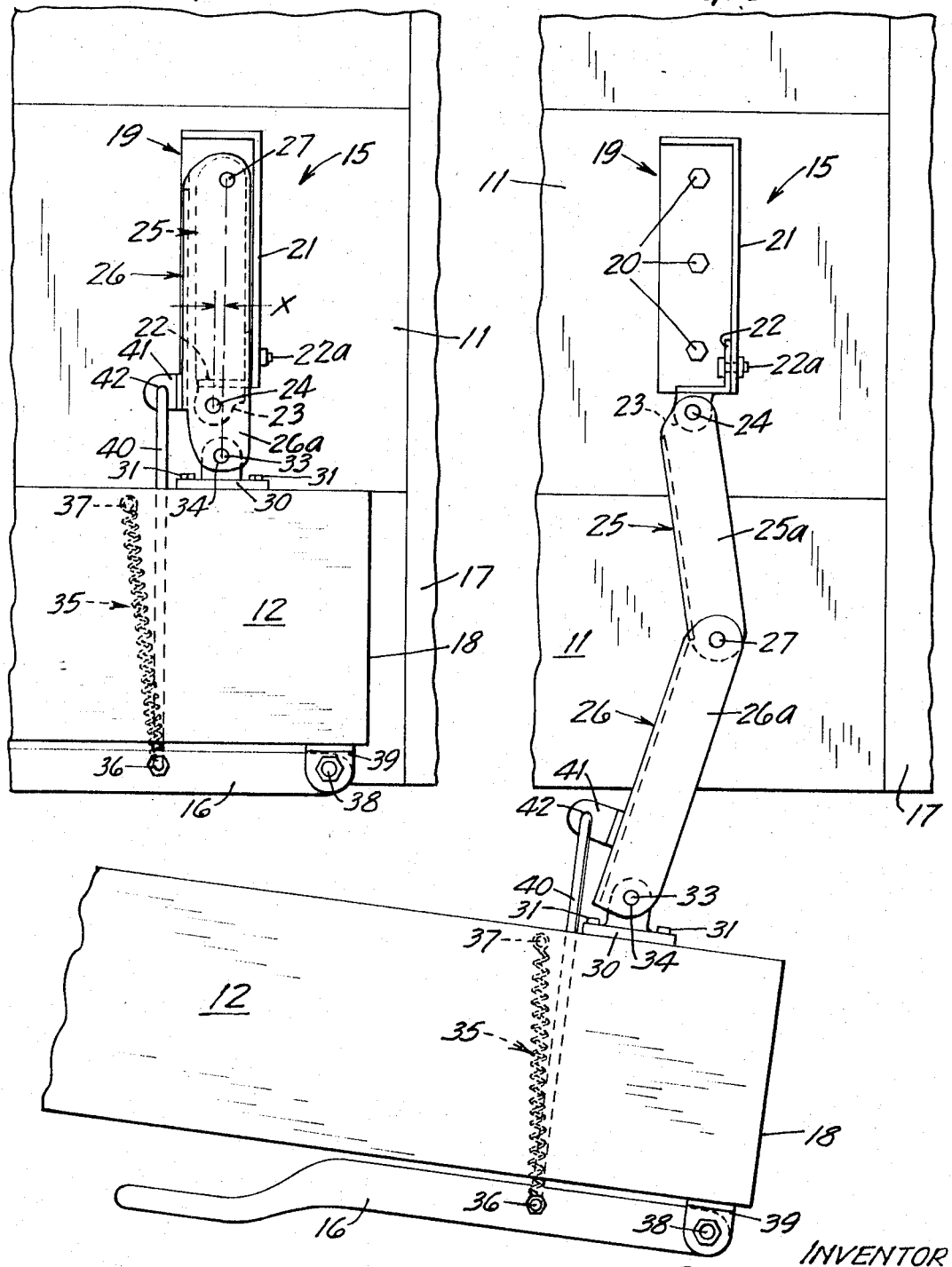
INVENTOR
BUFORD W. OLSON
BY Williamson, Palmatier & Bains
ATTORNEYS

United States Patent Office 3,355,233
Patented Nov. 28, 1967

3,355,233
EXTENSIBLE RETAINING DEVICE
Buford W. Olson, Hopkins, Minn., assignor to Charles Olson & Sons, Inc., Minneapolis, Minn., a corporation of Minnesota
Filed Oct. 7, 1966, Ser. No. 585,192
6 Claims. (Cl. 312—325)

ABSTRACT OF THE DISCLOSURE

An extensible and retractable linkage restrained against extension and retraction by inter-connecting pivots arranged in over center relation; the over center relation being established and maintained in both extension and retraction by action of a single spring, and being upset for both extension and retraction by operation of a lever in one direction and from a single rest position.

---

This invention relates to an extensible retaining or support device adapted to lock in the extended position and in the retracted position and more particularly relates to an extensible retaining support device adapted to connect a stationary frame with a shiftable frame which device locks both in the retracted position and in the extended position relative to the stationary frame.

Oftentimes, in the transport of such diverse items as varying diameter elongate rods, down spouts and ladders it is advantageous to mount the items for transport along the side of the transport or service truck. In so mounting elongate items, it is particularly important that the items do not slide from the mounting frame and are not bent or otherwise harmed during transport. Further, it is important that quick and efficient access be available to remove the selected item from the mounting frame without the need for removing all of the items. In transport, the mounting frame should be so arranged on the truck side such that the devices in transport do not slide from the mounting frame.

Summary of invention

An extensible articulated linkage with links lying against a stop and along each other in retracted condition, and a spring, connecting rod, and lever locking the linkage alternately in retracted and extended conditions.

With these comments in mind it is to the elimination of these and other disadvantages to which the present invention is directed, along with the inclusion therein of other novel and desirable features.

An object of my invention is the provision of a new and improved extensible retaining device of simple and inexpensive construction and operation.

Another object of my invention is to provide a novel extensible support device which locks in both the retracted position and in the extended position thereby securing items in the mounting frame during transport and permitting easy availability of the items in the mounting frame when in the extended position.

A further object of my invention is the provision of an extensible support member which, upon maniplation of an actuating lever, moves a shiftable mounting frame from a locked retracted position to a locked extended position.

A still further object of my invention is the provision of an improved extensible support device which is extremely simple in its assembly and operation and will thereby permit quick and easy operation and installation by a person of minimum skill or manual dexterity.

These and other objects and advantages of my invention will more fully appear from the following description made in connection with the accompanying drawings wherein like reference characters refer to the same or similar parts throughout the several views and in which:

FIG. 2 is an enlarged plan view of my extensible retaining device shown in the locked retracted position;

FIG. 3 is an enlarged plan view of my device shown in the locked extended position;

Figure 1:
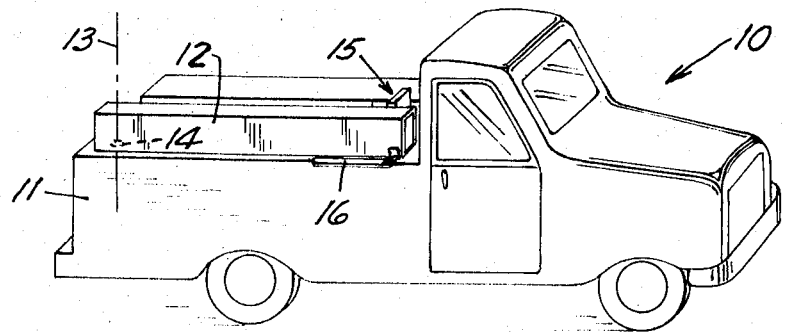
FIG. 1 is a diagrammatic sketch showing a typical usage of my extensible retaining device connecting a mounting frame to a truck.
Figure 4:
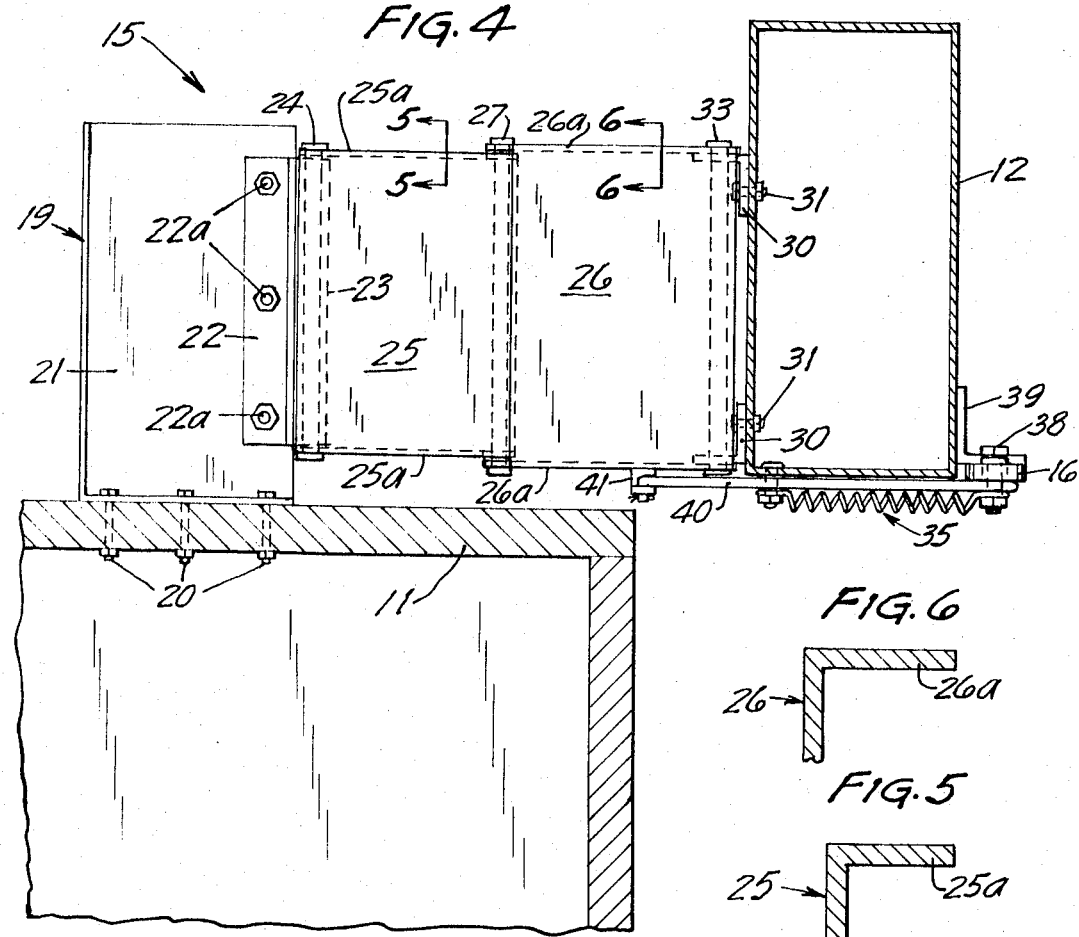
FIG. 4 is a sectional view of the extended support device taken along the lines 3—3 of FIG. 3.
Figure 6:
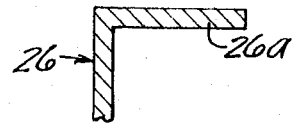
FIG. 6 is a sectional view taken along the lines 6—6 of FIG. 4.

One form of the present invention is shown in the drawings and is described herein. Referring to FIG. 1 a truck 10 is shown of the type having a bed 11 thereon. A receiving frame 12 adapted to receive elongate items such as spouts, ladders and tubing is pivotally mounted on bed or mounting surface 11 about a vertical axis denoted by the numeral 13 to permit pivoting of the receiving frame 12 about pivot 14. My extensible retaining device 15 is shown, mounted on the truck bed 11. My device is attached to the truck and, in turn, to receiving frame 12 to permit shiftable movement of the receiving frame 12 relative to the truck bed 11. Actuating lever 16 is shown pivotally attached to receiving frame 12.

Referring to FIG. 2, my extensible retaining device is shown in the retracted position mounted on the mounting surface 11 of the truck. An upright portion 17 divides the truck cab from the truck bed and aids in retaining items stored within the receiving frame 12 and prevents damage to the truck cab during transport. Upright portion 17 substantially covers the transverse openings, indicated at numeral 18, in the receiving frame 12. It should be noted that the receiving frame 12 may comprise an elongate tubular member having a circular or rectangular cross-section, or may be simply a skeletal structure adapted to receive ladders and the like. My extensible retaining device comprises a mounting plate 19 which is securely affixed to bed or mounting surface 11 as by bolt assemblies 20 shown in FIG. 3. The mounting plate is formed from rigid plate steel and includes an upright retracted position stop member 21 adapted to stop or retain the link members of my device from rotating out of the locked position. The link members are shown in retracted position nested at the mounting plate 19 and contacting the stop member 21.

Figure 5:
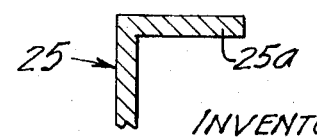
FIG. 5 is a sectional view taken along the lines 5—5 of FIG. 4.

The link members are fully extended, with the receiving frame 12 in the extended, locked position in FIG. 3. An upright angle element 22 is affixed to retracted position stop member 21 by bolts 22a. A pair of link members supports 23 are welded to the angle 21 and project outwardly therefrom. Supports 23 are made up from steel plate receive bolt 24 for rotatable movement therein and swingable mounting of inner link member 25 having an upper link element 25a and a corresponding lower link element 25b. Link member 25 is attached to support 23 by bolt assembly 24 for rotation about a vertical axis. Link member 25 has a cross-section as shown in FIG. 5. The link members are constructed from steel plate stock bent to form the link elements. Upper link element 25a and the lower link element 25b, are pivotally attached to outer link member 26 which includes an upper outer link element 26a and a lower outer link element 26b. The outer link elements 26a and 26b are rotatably attached to the inner link elements 25a and 25b and rotate about bolt assembly 27 which passes through link elements 25a and 25b and 26a and 26b. Outer link member 26 rotates about bolt assembly 27 from a retracted position at the mounting plate 19 and adjacent retracted position stop member 21 to an extended position with the link elements extended away from mounting plate 19.

Referring now to FIG. 2, the outer upper link element 26a as shown rotated about the bolt assembly 27 and link element 25a is correspondingly rotated about bolt assembly 24 so that link 26a is superimposed on link 25a and the corresponding lower links are also oriented such that the retracted link members cause the receiving frame 12 to be retracted longside the truck bed and with the opening 18 of the receiving frame adjacent the upright wall 17 between the truck bed and the cab of the truck. Link elements 26a and 26b are swingably attached to receiving frame 12 at brackets 30 which are affixed to frame 12 by bolt assemblies 31. Bolt assembly 33 passes through brackets 30 and receives upper outer link elements 26a and the corresponding lower outer link elements 26b for rotation about an upright axis about bolt 33 which passes through an aperture 34 in the outer end of link 26 and then through a corresponding aperture in the lower outer link element. Link member 26 is now free to rotate about bolt assembly 33 at the outer edge, and about bolt assembly 27 at the inner edge.

The link elements are maintained in the retracted position by the action of spring or bias means 35 which is attached to actuating handle 16 at the pivot point 36. The other end of the spring is attached to the undersurface of the receiving frame 12, as indicated at 37. In the retracted position, as well as in the extended position, spring 35 is under tension. Actuation of lever 16, which pivots at pivot point 38 in bracket 39 which is attached to receiving frame 12 permits shiftable movement of actuating lever 16 about a substantially vertical axis. Connecting rod 40 is pivotally attached to handle 16 at aperture 36 and extends to bracket 41 which, in turn, is attached to the lower outer link element. The action of spring or bias means 35 causes connecting rod 40 to be pulled by spring 35 inwardly toward bracket 41 into which connecting rod 40 is pivotally attached at aperture 42 on bracket 41. Since the spring 35 is in tension, connecting rod 40 is pulled inwardly and therefore exerts a force on bracket 41 which, in turn, transmits the force to the lower outer link element thereby holding the retaining element inwardly on stop member 21 with bolt assembly 24 out of straight line relation relative to bolt assemblies 27 and bolt 33. Therefore, since the link members are placed in position past dead center, and since they are held in this relation by stop member 21, and the action of spring 35 urging the outer link members inwardly against stop 21, the frame 12 is held in position when in transit. In the retracted position, it should be noted that the pivot bolt assemblies 27 and 33 are substantially in line with the pivot bolt assembly 24 offset, away from the dead center relation, a dimension indicated at (x).

In operation, my extensible retaining device is interchangeably positioned between the retracted position and the extended position by pulling lever 16 outwardly. When extending the device from the retracted portion to the extended position, lever 16, as it is pulled outwardly, overcomes the extension of spring 35 that urges rod 40 inwardly to retain the device in the retracted position. When rod 40 is pulled outwardly, the outer link member 26 which is connected to rod 40 through bracket 41 pivots about bolt assembly 33. Simultaneously, the inner link member 25 pivots about stationary bolt assembly 24, causing the pair of link members to swing away from mounting plate 19, thereby permitting the receiving frame 12 to pivot outwardly to the point at which the inner and outer link members and their respective bolt assemblies 24, 27 and 33 are in line, the dead center position. Lever 16 is then released and spring 35 urges rod 40 inwardly urging the outer link member to pivot outwardly past dead center to the position at which links 25 and 26 are extended and are in contact, preventing further outward movement.

The link members are maintained in the extended position by the action of the spring or bias means 35 which is attached to actuating handle 16 at the pivot point 36. In the extended position, spring 35 is also under tension thereby urging rod 40 inwardly. Rod 40 is connected to outer link member 26 through bracket 41 and at such times as bolt assembly 27 is not aligned with bolt assemblies 24 and 33 respectively, rod 40 urges outer link member accordingly. For example, a position of shaft 27 inwardly of the dead center, in line relation of bolt assemblies 24 and 33 urges the inner and outer link members inwardly toward the retracted position. However, a position of shaft 27 which is outwardly of dead center results in urging of the link members into an extended position retaining receiving frame 12 in the extended position without further manipulation or control of arm 16. Since further movement outwardly of the link members is prevented by the contact of outer link member 26 with inner link member 25 along the upright portions thereof the extensible device remains in the extended position.

It should be noted that spring 35 urges the link members to retain their respective positions in both the retracted arrangement and in the extended arrangement. Further, the receiving frame is interchangeably positioned between the retracted position and the extended position by identical manipulation of handle 16. In each instance, handle 16 overcomes the tension of spring 35 and pulls or pushes the outer link member 26 away from the past dead center position thereby permitting repositioning of the link members.

From the foregoing it will be seen that the extensible retaining device of my invention may be conveniently mounted on trucks which are adapted to transport elongate objects such as tubing or ladders. Of course, my extensible retaining device may be attached to store shelves and the like to provide efficient, convenient storage of difficult to handle elongate items. My extensible retaining device may be attached at one end of a receiving frame which may pivot at the other end to permit extension of the first end as well as attached to each end of a receiving frame to permit simultaneously extending the entire receiving frame outwardly or inwardly rather than pivoting the receiving frame.

I have provided a simple, positive action device for safely storing items for transport yet affording easy access to the otherwise difficult to handle items.

It will, of course, be understood that various changes may be made in the form, details, arrangement and proportions of the parts without departing from the scope of my invention.

What is claimed is:

1. An extensible retaining device adapted to extend from a retracted position to an extended position, said extensible retaining device adapted to be affixed to a mounting surface at one end and to a receiving frame at the other end to permit relative movement therebetween said extensible device comprising, a retracted position stop member adapted to be affixed to a mounting surface, an inner link member pivotally attached at one end to said retracted position stop member, said inner link member adapted to project outwardly of said stop member in the extended position and to engage said stop member in the retracted position, an outer link member pivotally attached at one end to the other end of said inner link member and at the other end adapted to be pivotally attached to the receiving frame said outer link member, in the extended position, adapted to extend substantially outwardly from the extended position of said first link member and, in the retracted position, adapted to contact said stop member in substantially superimposed relation relative to said inner link member, one of said link members having an extended position stop element attached thereto whereby movement past a predetermined position is retarded, lever means adapted to be pivotally attached to the receiving frame whereby said extensible device may be interchangeably positioned in the retracted position and in the extended position, a connecting rod pivotally attached at one end to said lever means and pivotally attached at the other end to said outer link member, and bias means adapted to urge said lever means and said connecting rod toward said outer link member, said bias means urging said lever means and said connecting rod to permit, in the retracted position, urging of said outer link member into contact with said stop member thereby locking said extensible device in the retracted position and, in the extended position, urging said outer link member in the predetermined position thereby locking said extensible device in the extended position.

2. The extensible retaining device of claim 1 wherein said retracted position stop member is adapted to be affixed to a substantially horizontal mounting surface.

3. The extensible retaining device of claim 2 wherein said inner link member is pivotally attached to said retracted position stop member for rotation about a substantially vertical axis, wherein said outer link member is pivotally attached to said inner link member for rotation about a substantially vertical axis and wherein the outer link member is adapted to be attached to the receiving frame for rotation about a substantially vertical axis.

4. The extensible retaining device of claim 1 wherein said inner link member comprises a pair of parallel spaced apart inner link elements and wherein said outer link member comprises a pair of parallel spaced apart outer link elements.

5. The extensible retaining device of claim 1 wherein said bias means comprises a helically wound spring member mounted under tension with one end attached to said lever means and the other end adapted to be attached to the receiving frame.

6. The extensible retaining device of claim 4 wherein at least one of said outer link elements includes an extended position stop element attached thereto whereby movement of said outer link element past a predetermined position is prevented.

No references cited.

BOBBY R. GAY, *Primary Examiner.*

JAMES L. KOHNEN, *Assistant Examiner.*